United States Patent [19]

Maeda et al.

[11] Patent Number: 4,934,031
[45] Date of Patent: Jun. 19, 1990

[54] AUTOMATIC PALLET CHANGER

[75] Inventors: Norihide Maeda, Kashiharashi; Masanobu Teraoka, Tenrishi, both of Japan

[73] Assignee: Kabushiki Kaisha Mori Seiki Seisakusho, Nara, Japan

[21] Appl. No.: 397,131

[22] Filed: Aug. 22, 1989

[30] Foreign Application Priority Data

Aug. 23, 1988 [JP] Japan .................. 63-209171

[51] Int. Cl.⁵ .................. B23Q 41/02; B65G 47/00
[52] U.S. Cl. .................. 29/33 P; 29/563; 414/744.3; 198/346.1
[58] Field of Search ........... 29/33 P, 563, 565, 568; 198/346.1, 465.1, 465.2; 414/744.3, 744.8; 408/71; 269/58, 70, 309

[56] References Cited

U.S. PATENT DOCUMENTS 4,637,108  1/1987  Murata et al. .................. 29/33 P
4,797,052  1/1989  Ohta et al. .................. 29/33 P X Primary Examiner—Z. R. Bilinsky
Attorney, Agent, or Firm—Antonelli, Terry, Stout & Kraus

[57] ABSTRACT

An automatic pallet changer includes a pallet supporter for receiving a first pallet, a table for receiving a second pallet on the machine, a pallet exchanger arm carried on a supporting shaft disposed between the pallet supporter and the table, the exchanger arm being rotative around the supporting shaft and movable up and down along it, the exchanger arm carrying the first pallet at one hand and the second pallet at the other hand.

6 Claims, 5 Drawing Sheets

AUTOMATIC PALLET CHANGER

BACKGROUND OF THE INVENTION

The present invention relates to an automatic pallet changer for loading and unloading a pallet supporting a workpiece for a machine tool.

The known pallet changers of this kind are provided with an exchanger arm located between the table of the machine and the pallet receiver where the pallets are exchanged. The exchanger arm is rotatable around a vertical supporting shaft and also movable up and down along the shaft.

A disadvantage of this type of pallet changers is that the pallet exchange takes a relatively long time. The slow speed of pallet exchange is due to the fact that the exchanger arms must be long enough to reach and catch the peripheral portion of the pallet. As a result the radius of the circular movement of the exchanger arms becomes large, and they are in danger of colliding with other objects such as rails and guides which are used to transport the pallet to a place where the pallets are exchanged. In addition, because of the larger circular movement, the speed of the exchanger arms is unavoidably reduced.

SUMMARY OF THE INVENTION

Accordingly, an object of the present invention is to provide a pallet changer capable of exchanging the pallets quickly.

Another object of the present invention is to provide a pallet changer capable of moving in association with the pallet clamps on the machine table.

According to the present invention there is provided an automatic pallet changer includes a pallet supporter for receiving a first pallet, a table for receiving a second pallet on the machine, a pallet exchanger arm carried on a supporting shaft disposed between the pallet supporter and the table, the exchanger arm being rotative around the supporting shaft and movable up and down along it, the exchanger arm carrying the first pallet at one hand and the second pallet at the other hand.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENT

Figure 1:
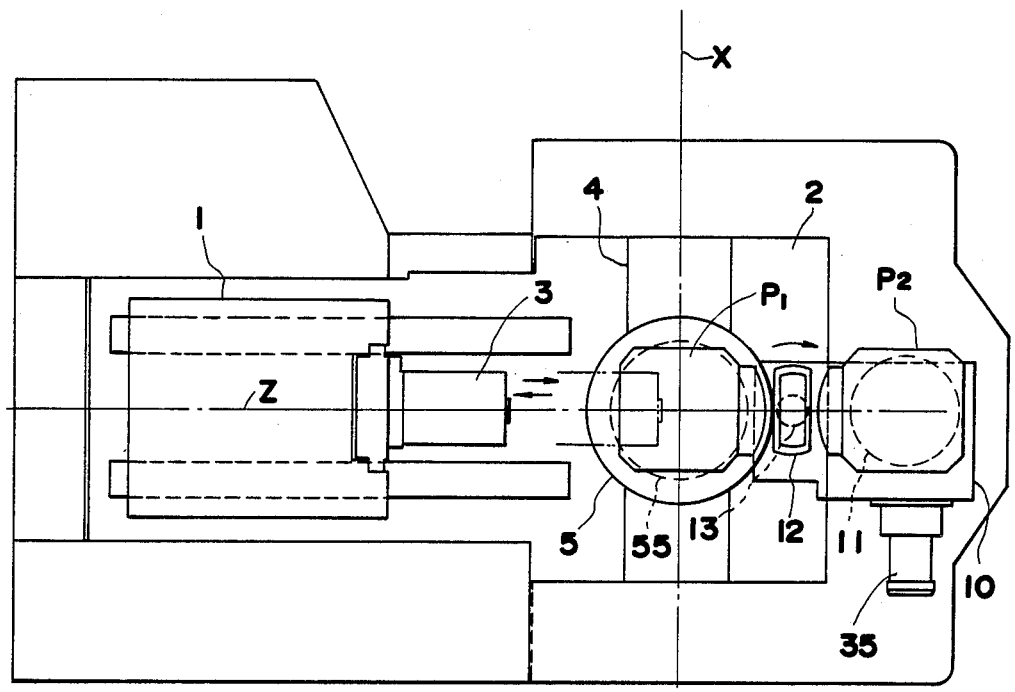
FIG. 1 is a plan view showing a machining center incorporating an automatic pallet changer.

Referring now to the drawings wherein like reference numerals are used throughout the various views to designate like parts and, more particularly, to FIG. 1, according to this figure, a pallet changer is mounted on a machine or machining center, with the machine including a body 1, a bed 2 and a main spindle 3, and with the body 1 being movable along the Z-axis in a direction of the arrows.

The machine includes a table 5 which is placed on the bed 2 and is movable along a guide rail 4 along the X axis. The table 5 accommodates a pallet clamping device 55 whereby a pallet ($P_1$) supporting a workpiece (not shown) is clamped. The workpiece is machined by a tool (not shown) carried on the main spindle 3.

The pallet changer includes a body frame 10 disposed at the front of the bed 2. Above the body frame 10 there is provided a pallet supporter 11 in opposition to the table 5, which is positioned at a place where the pallets are exchanged. An exchanger arm 12 is disposed between the table 5 and the pallet supporter 11, and is carried on a supporting shaft 13 such that the exchanger arm 12 rotates around the supporting shaft 13 and moves along the supporting shaft 13.

Figure 2:
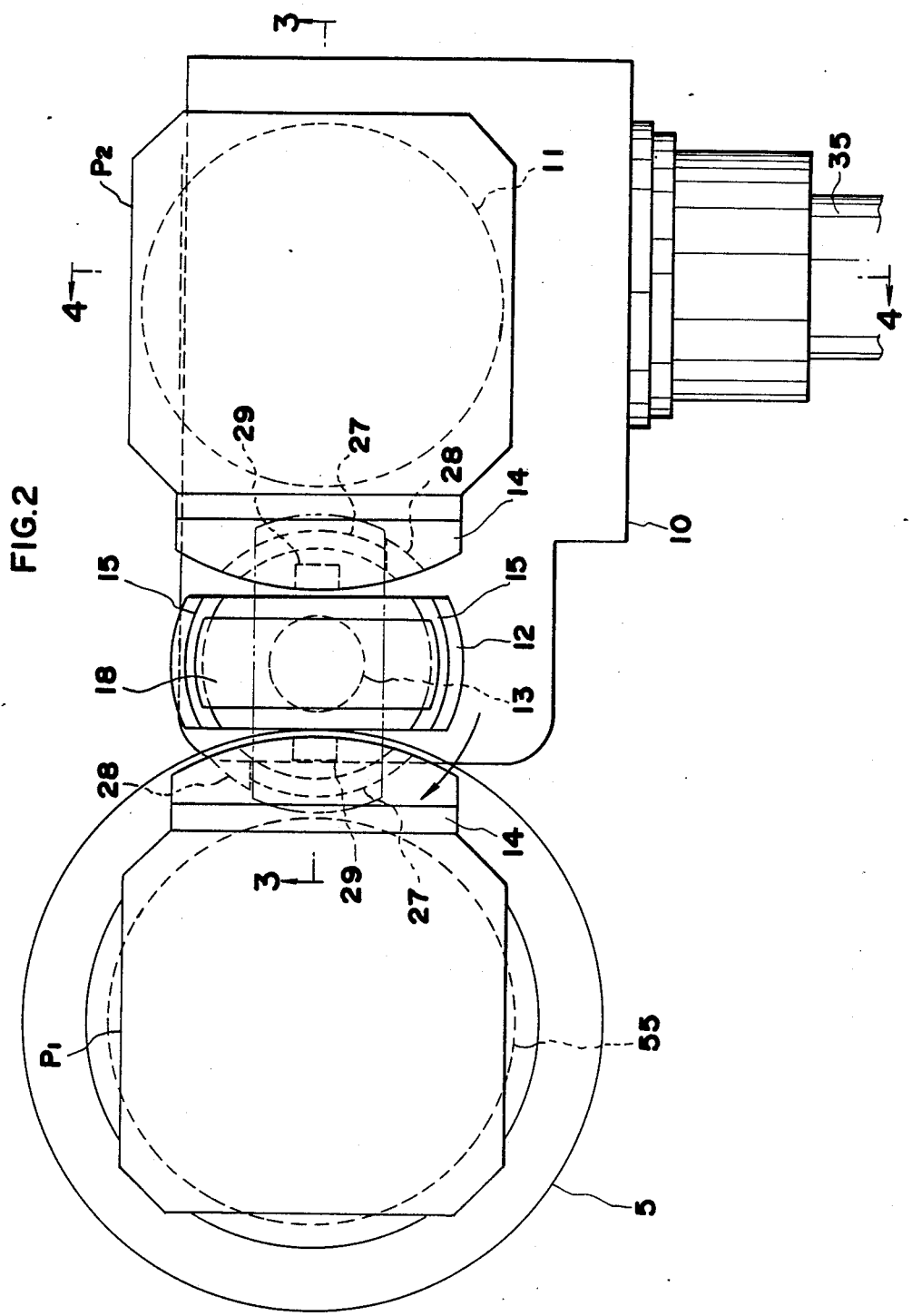
FIG. 2 is an enlarged plan view showing the pallet changer of FIG. 1.
Figure 3:
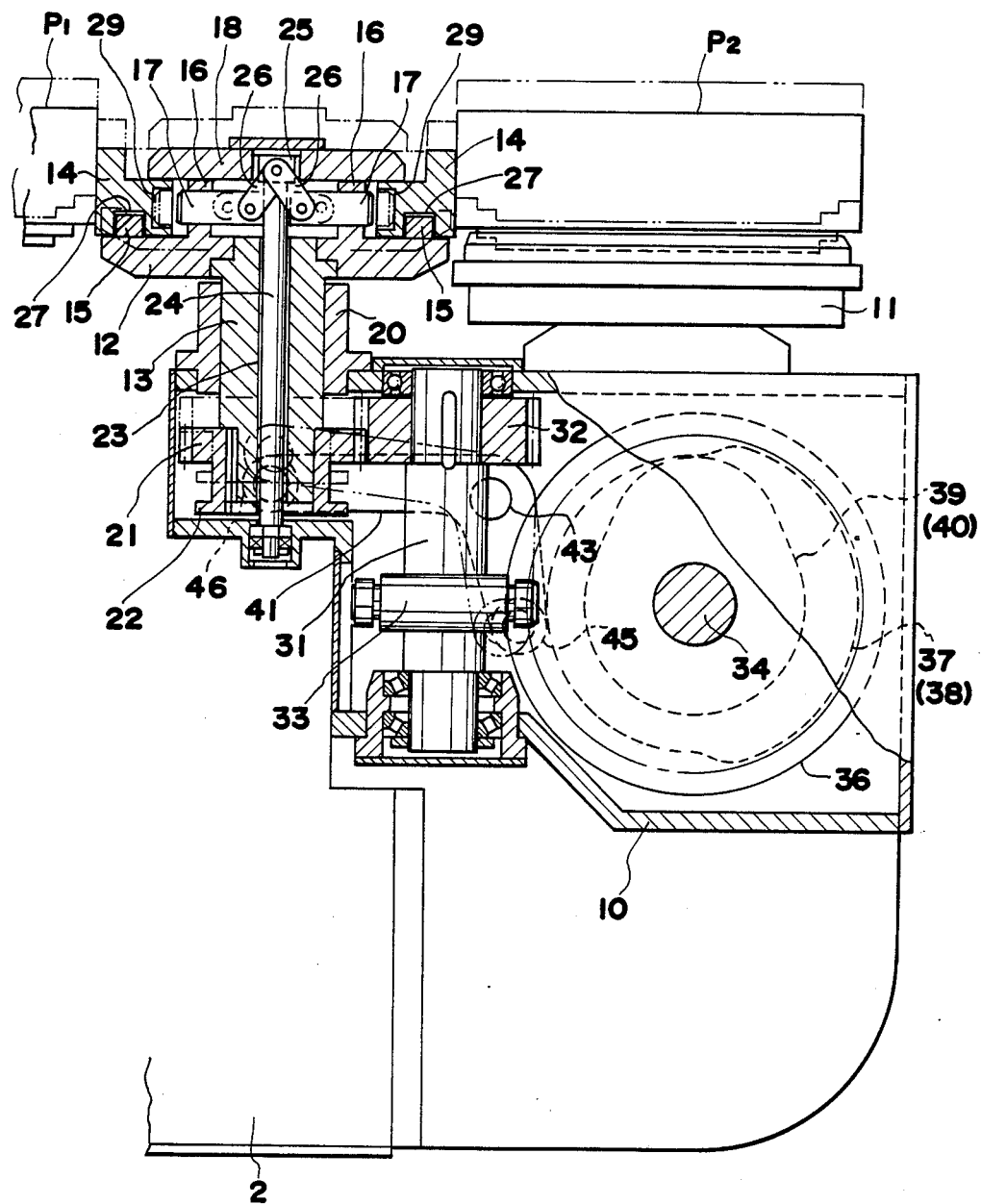
FIG. 3 is a vertical cross-section taken along the line 3—3 in FIG. 2.
Figure 4:
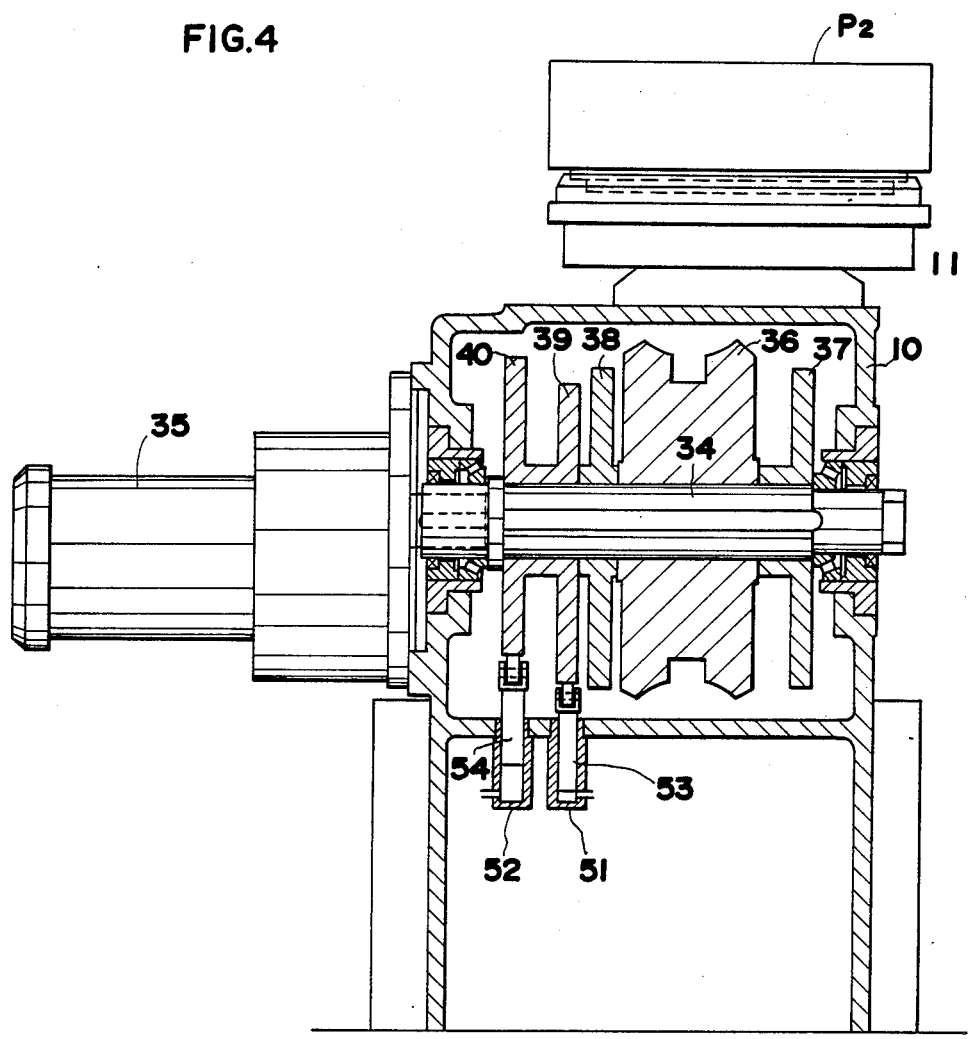
FIG. 4 is a vertical cross-section taken along the line 4—4 in FIG. 2.

The pallet supporter 11, as shown in FIGS. 2 to 4, is disposed above the body frame 10, and receives a pallet $P_2$ having a workpiece transported from a pallet magazine or a pallet pool.

Each pallet $P_1$ and $P_2$ is provided with an engager block 14 engageable with the exchanger arm 12. The two pallets $P_1$ and $P_2$ are positioned such that the respective blocks 14 are opposed to each other.

The exchanger arm 12, as shown in FIGS. 2 and 3, is made of a rectangular short plate having semi-circular ridges 15 formed concentrically with the supporting shaft 13 at opposite ends. The exchanger arm 12 is provided with slidable lock pins 17 carried on posts 16 erected thereon, with an upper plate 18 being secured to the posts 16.

The supporting shaft 13 is carried in a cylindrical boss 20 secured to the body frame 10 such that the shaft 13 can rotate and move in the direction of length. As described above, the supporting shaft 13 supports the exchanger arm 12 at its upper section, and has transmission gears 21 and a wheel 22 in its lower section. In addition, the supporting shaft 13 is provided with a bore 23 axially formed in which a rod 24 is accommodated in a free state to operate the lock pins 17. The rod 24 is rotatably connected to the body frame 10 at its lower end, and extends upward until the upper end 25 is housed in a space in the upper plate 18 of the exchanger arm 12. The lock pins 17 are pivotally connected to the upper part 25 of the rod 24 through links 26. When the exchanger arm 12 moves up together with the supporting shaft 13, the lock pins 17 extend in the respective outward directions as shown in FIG. 3, thereby locking the pallets $P_1$ and $P_2$.

Each engager block 14 is provided with a semi-circular groove 27 with which the engager ridge 15 of the exchanger arm 12 is engaged. The groove 27 is provided with a stop pin 18 (FIG. 2). Each block 14 is provided with a recess 29 for receiving the lock pin 17.

The engager ridge 15 of the exchanger arm 12 fits in the circular groove 17 of the block 14, thereby maintaining the pallets $P_1$ and $P_2$ on the respective sides of the exchanger arm 12. At this stage the exchanger arm 12 rises up, and the lock pins 17 extrude radially to fit in the recesses 29. In this way the pallets $P_1$ and $P_2$ are locked.

Figure 5:
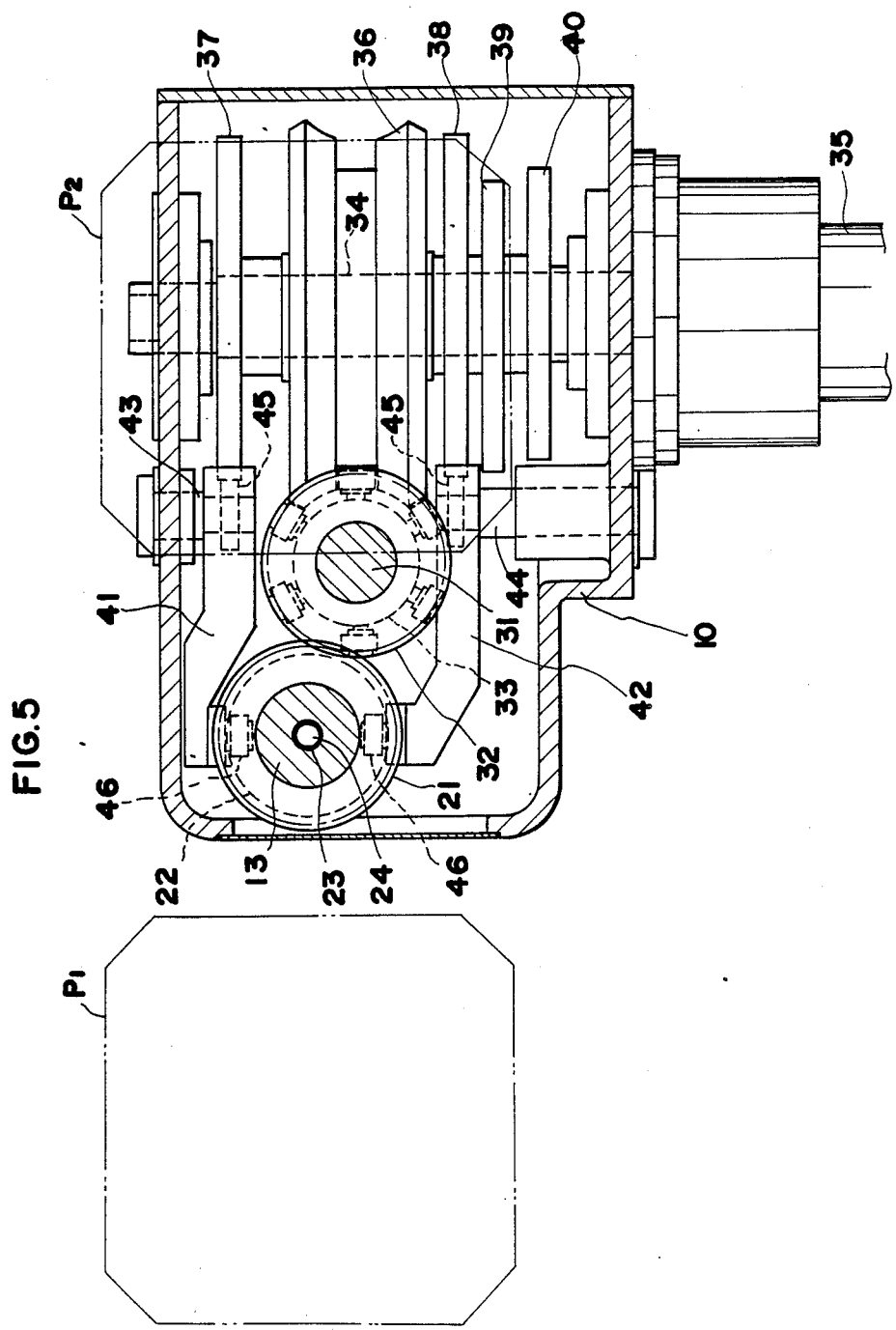
FIG. 5 is a cross-sectional plan view showing portion of the pallet changer of FIG. 1.

The shaft 13, which supports the exchanger arms 12, is rotated and moved up and down by a driving unit which will be described by reference to FIGS. 3 to 5.

There is provided an intermediate transmission shaft 31 which is rotatably mounted on the body structure 10 in parallel with the shaft 13. The driving shaft 31 carries a gear 32 engageable with a gear 21, and a turret 33 of a cam unit, with the turret 33 including radially arranged rollers.

The body structure 10 carries a driving shaft 34, driven by a geared motor 35 and arranged perpendicularly to the intermediate transmission shaft 31. The driving shaft 34 is equipped with a cam 36 of the cam unit, cam plates 37, 38 for the exchanger arms 12 moving up and down, and two cam plates 39, 40 for driving hydraulic cylinders 51 and 52 (FIG. 4) which release the clamp unit 55 on the table 5.

Link members 41, 42 move in association with the cam plates 37 and 38, with the link members 41 and 42, being respectively rotatably supported on pivots 43 and 44. The link members 41 and 42 are provided with cam followers 45 at one end thereof which contact the cam plates 37 and 38, respectively, and with rollers 46 at the other ends which contact a wheel 22.

As shown in FIG. 4, pistons 53 and 54, operated by the cam plates 39 and 40, push the oil in the hydraulic cylinders 51 and 52, thereby enabling the oil to enter the clamp unit 55. The pistons 53 and 54 are operated synchronously with the operation of the clamp unit 55.

The pallet changer is operated as follows:

The initial position at which the exchanger arm 12 starts to operate is indicated by the full lines in FIGS. 1 and 2. At this stage the driving shaft 34 is rotated, and the turning moment is transmitted to the exchanger arm 12 through the intermediate transmission shaft 31, the gear 32, the gear 21 and the supporting shaft 13. In FIG. 1 the exchanger arm 12 is rotated at 90° in the direction of arrow, thereby enabling the engager ridges 15 thereof to fit in the grooves 27. In this way the pallets $P_1$ and $P_2$ are supported.

The pistons 53 and 54 are operated by the cam plates 39 and 40 to push the oil in the hydraulic cylinders 51 and 52 into the clamp unit 55 on the table 5, thereby releasing the pallet $P_1$ (unclamping).

The link members 41 and 42 operated by the cam plates 37 and 38 raise the supporting shaft 13 through the wheel 22 to the position indicated by the dotted lines in FIG. 3. At this stage the lock pins 17 extends outward and fit in the recesses 29, thereby locking the pallets $P_1$ and $P_2$. The exchanger arms 12, while rising in accordance with the ascent of the supporting shaft 13, raise the pallets $P_1$ and $P_2$ above the table 5 and the pallet supporter 11. While the pallets $P_1$ and $P_2$ are in the raised state, the exchanger arm 12 rotates at 180°, thereby enabling the pallets $P_1$ and $P_2$ to replace each other's positions.

Then, the exchanger arm 12 descends up to the position indicated by the full lines in FIG. 3, and places the pallet $P_1$ on the pallet supporter 11, and the pallet $P_2$ on the table 5. In accordance with the descent of the exchanger arm 12 the lock pins 17 are disengaged from the recesses 29, thereby unlocking the pallets $P_1$ and $P_2$.

Subsequently, the exchanger arm 12 rotates at 90° and returns to the starting position indicated by the full lines in FIGS. 1 and 2. The pallet $P_2$ left on the table 5 is clamped by the clamp unit 55, and the workpiece placed thereon is machined by a tool (not shown) of the machine. The oil in the clamp unit 55 is forced back to the hydraulic cylinders 51 and 52, same procuedure is repeated.

What is claimed is:

1. An automatic pallet changer, the automatic pallet changer comprising:
    a pallet supporter means for receiving a first pallet;
    a table means for receiving a second pallet;
    a pallet exchanger arm means carried on a supporting shaft disposed between the pallet supporter means and the table means, the exchanger arm means being rotatable about the supporting shaft and being vertically movable up and down along said supporting shaft;
    a driving means for effecting the rotatable and vertical movement of the pallet exchanger arm means;
    a clamp means for clamping the second pallet on the table means;
    an operating means for operating the clamp means; and
    wherein the pallet exchanger arm means comprises an engaging means at opposite ends thereof, said first and second pallets are each provided with an engager means at one side thereof for respectively engaging the engaging means provided at the respective opposite ends of the pallet exchanger arm means, whereby the first pallet is carried at one end of the pallet exchanger arm means and the second pallet is simultaneously carried at the other end of the pallet exchanger arm means.

2. An automatic pallet changer as set forth in claim 1, wherein means are provided for operating the driving means and operating means in association with each other.

3. An automatic pallet changer as set forth in claim 2, wherein the means for operting includes a hydraulic system.

4. An automatic pallet changer, the automatic pallet changer comprising:
    a pallet supporter for receiving a first pallet;
    a table for receiving a second pallet;
    a pallet exchanger arm carried on a supporting shaft disposed between the pallet supporter and the table, the exchanger arm being rotatable about the supporting shaft and being vertically movable along said supporting sahft;
    a driving means for effecting the rotation and vertical movement of the exchanger arm;
    a clamp unit for clamping the second pallet on the table;
    an operting means for operating the clamp means;
    wherein the exchanger arm comprises an engaging means at each end, one of the engaging means being engageable with an engaging member of the first pallet on the pallet supporter and an engaging member on the second pallet of the table, thereby carrying the first pallet at one end and the second pallet at the other end, and wherein the engaging means of the exchanger arm comprises an engager ridge formed in a semi-circle concentrically with the supporting shaft and a lock pin, and each of the engaging members comprises a semi-circular groove and a stop means provided in the semi-circular groove.

5. An automatic pallet changer as set forth in claim 2, wherein means are provided for operating the driving means and the operating means in association with each other.

6. An automatic pallet changer as set forth in claim 3, wherein the means for operting include a hydraulic system.

* * * * *